United States Patent
Neve De Mevergnies et al.

(10) Patent No.: US 9,736,181 B2
(45) Date of Patent: Aug. 15, 2017

(54) HARDENING DATA TRANSMISSIONS AGAINST POWER SIDE CHANNEL ANALYSIS

(71) Applicant: INTEL CORPORATION, Santa Clara, CA (US)

(72) Inventors: Michael Neve De Mevergnies, Beaverton, OR (US); Manoj Sastry, Portland, OR (US); Ioannis Schoinas, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 153 days.

(21) Appl. No.: 13/952,301

(22) Filed: Jul. 26, 2013

(65) Prior Publication Data

US 2015/0033338 A1 Jan. 29, 2015

(51) Int. Cl.
*H04L 29/06* (2006.01)
*H04L 9/00* (2006.01)

(52) U.S. Cl.
CPC .......... *H04L 63/1475* (2013.01); *H04L 9/003* (2013.01); *H04L 2209/34* (2013.01)

(58) Field of Classification Search
CPC ......... G06F 21/00; H04L 29/06; H04L 9/004; H04L 63/1475; H04L 63/1441
See application file for complete search history.

(56) References Cited

U.S. PATENT DOCUMENTS

| | | | | |
|---|---|---|---|---|
| 5,475,388 A | * | 12/1995 | Gormish | ............... G06T 9/005 341/106 |
| 7,398,441 B1 | * | 7/2008 | Gee | ............................... 714/727 |
| 2003/0177373 A1 | | 9/2003 | Moyer et al. | |
| 2006/0215433 A1 | * | 9/2006 | Fischer | .................... G06F 21/74 365/60 |
| 2006/0282734 A1 | * | 12/2006 | Milne | ..................... G06F 21/35 714/742 |
| 2007/0055868 A1 | * | 3/2007 | Brier | ..................... H03M 13/05 713/162 |

(Continued)

FOREIGN PATENT DOCUMENTS

EP 1443338 A1 8/2004

OTHER PUBLICATIONS

Bolchini et al., A State Encoding for Self-Checking Finite State Machines.*
Extended European Search Report received for European Patent Application No. 14178647.5 mailed on Apr. 1, 2015, 8 pages.

(Continued)

*Primary Examiner* — Eleni Shiferaw
*Assistant Examiner* — Huan V Doan
(74) *Attorney, Agent, or Firm* — Schwabe, Williamson & Wyatt, P.C.

(57) ABSTRACT

Embodiments of an invention for hardening data transmissions against power side channel attacks are disclosed. In one embodiment, a system includes a first agent and a second agent. The first agent is to transmit an encoded datum through an interface in a plurality of encoded packets. The second agent is to receive each of the plurality of encoded packets from the interface and decode each of the encoded packets to generate a plurality of decoded packets. Each of the encoded packets has the same Hamming weight. The Hamming distance between any two consecutively transmitted encoded packets is constant.

16 Claims, 3 Drawing Sheets

(56) References Cited

U.S. PATENT DOCUMENTS

| | | | |
|---|---|---|---|
| 2007/0076864 A1* | 4/2007 | Hwang | G06F 7/00 |
| | | | 380/29 |
| 2010/0208894 A1* | 8/2010 | True | B60R 25/24 |
| | | | 380/270 |
| 2011/0138192 A1* | 6/2011 | Kocher | G06F 21/602 |
| | | | 713/189 |
| 2011/0145595 A1* | 6/2011 | Kim | G06F 21/556 |
| | | | 713/189 |
| 2012/0201136 A1* | 8/2012 | Williams | H04W 28/0273 |
| | | | 370/231 |
| 2012/0250854 A1* | 10/2012 | Danger | H04L 9/003 |
| | | | 380/28 |
| 2013/0151842 A1* | 6/2013 | Yu | H04L 9/003 |
| | | | 713/150 |

OTHER PUBLICATIONS

Fu et al., "On Equidistant Constant Weight Codes", Electronic Notes in Discrete Mathematics, North-Holland, Amsterdam, NL, vol. 6, Apr. 1, 2001, pp. 187-194.
Alex Postnikov, "Matroids", 3d Colombian Encounter on Combinatorics ECCO 2012, Jun. 12, 2012, pp. 1-14.
Axel Kohnert, "Two-Weight Codes with prescribed Symmetries", poster at Special Semester on Groebner Bases—Algebraic Combinatorics in Linz, Jan. 1, 2006, 1 page.
Office Action Received for European Patent Application No. EP14178647.5, mailed on Aug. 10, 2016, 5 pages.
Office Action Received for European Patent Application No. EP14178647.5, mailed on Feb. 13, 2017, 5 pages.

\* cited by examiner

METHOD 300

HARDENING DATA TRANSMISSIONS AGAINST POWER SIDE CHANNEL ANALYSIS

BACKGROUND

1. Field

The present disclosure pertains to the field of information processing and more particularly, to the field of security in information processing systems.

2. Description of Related Art

Malicious attacks are a serious threat to the security of information processing systems. Side channel attacks me analyses of power consumption, electromagnetic radiation, or other characteristics of a data processing system to infer information about the system or the data it is processing. As one example, side channel analysis during the distribution of a content protection key, debug unlock key, or other type of key might be used by an attacker to help to detect the value of the key. Many techniques have been developed to defend against side channel attacks, but more are needed as information processing system development continues.

BRIEF DESCRIPTION OF THE FIGURES

The present invention is illustrated by way of example and not limitation in the accompanying figures.

DETAILED DESCRIPTION

Figure 1:
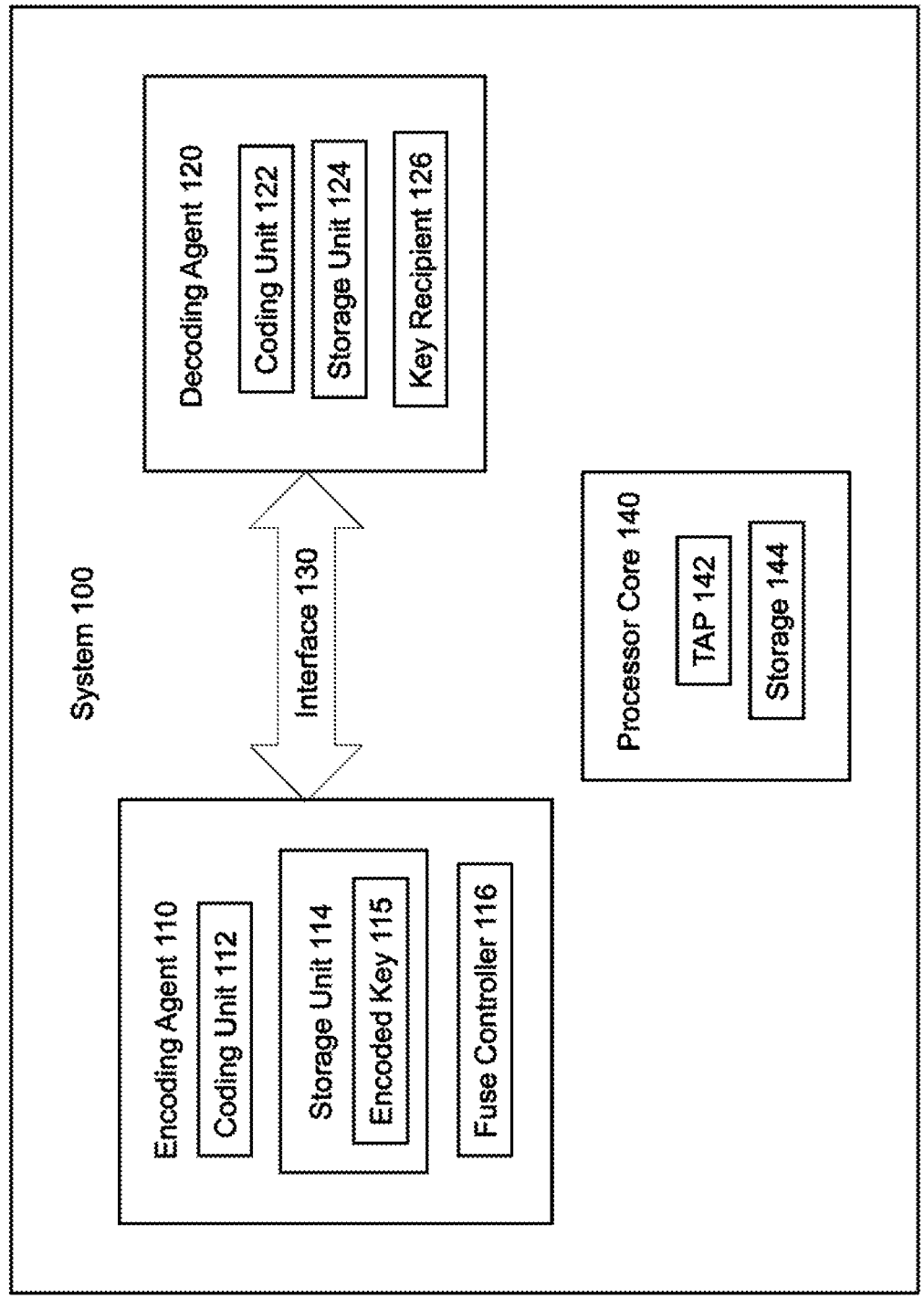
FIG. 1 illustrates a system in which data transmissions may be hardened according to an embodiment of the present invention.

Embodiments of an invention for hardening data transmissions against power side channel analysis are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first" "second," "third," etc. to describe an element merely indicate that particular instance of an element or different instances of like elements are being referred to, and is not intended to imply that the elements so described must be in a particular sequence, either temporally, spatially, in ranking, or in any other manner.

Also, the terms "bit," "flag," "indicator," "field," "entry," etc., may be used to describe any type of storage location, or the contents thereof, in a register, table, database, or other data structure, whether implemented in hardware or software, but are not meant to limit embodiments of the invention to any particular type of storage location or number of bits or other elements within any particular storage location.

As described in the background section, information might be leaked from a system through a side channel. For example, power consumption during data transmission might vary might vary depending on the Hamming weight of the data being transmitted and/or the Hamming distance between the old data and the new data when the value of the data changes. Therefore, an attacker might be able to use power side channel analysis to reduce the search space required to discover the value of the data through trial and error.

For illustrative purposes, consider the transmission of a secret eight-bit binary value in two four-bit data packets over a four-bit datapath, where the secret value is 0101 1011. Using a brute force trial and error approach to discovering the secret value, the search space would include $2^8$ or 256 candidates. However, through power consumption measurements, an attacker might learn that the Hamming weight of the lower order packet is three and the Hamming weight of the higher order packet is two. Since there are only four possible four-bit values with a Hamming weight of three (0111, 1011, 1101, and 1110) and there are only six possible four-bit values with a Hamming weight of two (0011 0101, 0110, 1001, 1010, and 1100), the search space would be reduced to 4*6 or 24 candidates. Therefore, embodiments of the present invention may be desirable to avoid the leakage of information based on Hamming weights and Hamming distances.

FIG. 1 illustrates system 100, an information processing system in which data transmissions may be hardened according to an embodiment of the present invention. System 100 may represent any type of information processing system, such as a server, a desktop computer, a portable computer, a set-top box, a hand-held device such as a tablet or a smart phone, or an embedded control system. System 100 includes encoding agent 110, decoding agent 120, and interface 130. Systems embodying the present invention may include any number of each of these components and any other components or other elements, such as system memory, storage devices, peripherals, and input/output devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

Encoding agent 110 may represent any component, device, other agent, or portion thereof that may encode data and/or store data encoded according to an embodiment of the present invention. In one embodiment, encoding agent 110 is a processor or processor core in the Intel® Core® Processor Family, Intel® Atom® Processor Family, other processor family from Intel® Corporation, or another general purpose processor, special purpose processor, embedded controller, or other microprocessor or microcontroller from Intel® Corporation any other company.

Decoding agent 120 may represent any component, device, other agent, or portion thereof that may decode data and/or store data encoded and/or decoded according to an embodiment of the present invention. In one embodiment, decoding agent 120 is a processor or processor core in the Intel® Core® Processor Family, Intel® Atom® Processor Family, other processor family from Intel® Corporation, or another general purpose processor, special purpose processor, embedded controller, or other microprocessor or microcontroller from Intel® Corporation any other company.

Encoding, agent 110 and decoding agent 120 may be two identical instances of the same processor, processor core, or other agent; they may be in the same family, have the same architecture or instruction set, and/or be the same in any other way or ways, or they may be entirely different. They may be together on a the same chip, die, or substrate, in the same package, on the same integrated circuit board, in the same computer or computing machine, or, in an embodiment where system 100 represents a peer-to-peer, client-server, or any other distributed computer system, they may be in entirely different computers or computing machines.

Interface 130 may represent any type of bus, point-to-point, or other wired or wireless interface or connection. In embodiments in which encoding agent 110 and decoding agent 120 are on the same chip, die, or substrate, interface 130 may be any type of internal bus, a link in an interconnect fabric such as an Intel® On-Chip System Fabric, or any other type of connection according to any other communication architecture. In embodiments in which encoding agent 110 and decoding agent 120 are on different chips, dice, substrates or in different packages, interface 130 may represent any type of external bus, a link in an interconnect fabric such as an Intel® Quick Path Interconnect or an embodiment of a High Performance Interconnect described in the co-pending U.S. patent application entitled Method, Apparatus, System for a High Performance Interconnect architecture, filed Oct. 22, 2012, Ser. No. 61/717,091, or any other type of connection according to any other communication architecture. Data, control information, and/or or other information may be transmitted or otherwise sent between encoding agent 110 and decoding agent 120 through interface 130 in packets, messages, or any other means according to the protocol of any such interconnection or communication architecture. In various embodiments, encoding the data to be transmitted on interface 130 may reduce the effectiveness of power side channel attacks, and dedicating interface 130 to such transmissions may reduce the effectiveness of other side channel attacks, such as template attacks.

Encoding agent 110 may include coding unit 112 and storage unit 114. Decoding agent 120 may include coding unit 122 and storage unit 124.

Each of coding units 112 and 122 may include any circuitry, state machines, structures, and/or other hardware to encode and/or decode data according the embodiments of the present invention as further described below. In one embodiment, coding unit 112 may include a dedicated encoding state machine and coding unit 122 may include a dedicated decoding state machine, but these state machines may be included within any other functional units or elsewhere in encoding agent 110 and decoding agent 120, respectively such as within an execution or interface unit of a processor, and/or coding unit 112 and/or 122 may be implemented using hardware that is shared with or otherwise included within any functional unit or elsewhere in encoding agent 110 and decoding agent 120, respectively.

Each of storage units 114 and 124 may include any combination of an type of storage usable for any purpose within encoding agent 110 and decoding agent 120, respectively; for example, they may include any number of readable, writable, programmable, fusible, and/or read-writable registers, buffers, and/or caches, implemented using any memory or storage technology, as well as circuitry usable to access such storage. In one embodiment, storage units 114 and 124 may include dedicated storage for encoded data, but they may also represent all or a portion of storage used for any other purpose.

In one embodiment in which system 100 represents an SOC, encoding agent 110 may include a fuse controller 116 that distributes fused values, such as keys, to other agents. In such an embodiment, storage unit 114 may include a fuse array into which encoded values of keys, such as encoded key 115, or other data may be programmed. Encoded key 115 may represent a content protection key, a debug unlock key, or any other type of key encoded according to an embodiment of the present invention.

In one embodiment in which system 100 represents an SOC, decoding agent 120 may include a key recipient 126 that may be used to support any key-related function, such as the testing or debugging of any processor core, controller, agent, or other component in system 100. In one embodiment, one such processor core 140 may include a test access port (TAP) 142 designed to function in compliance with a standard such as Institute of Electrical and Electronic Engineers (IEEE) 1149.1 Standard Test Access Port and Boundary-Scan Architecture originally developed by the Joint Test Action Group (JTAG), or any other test or debug standard or protocol. Key recipient 126 may also support debugging or any other key-related function of any number of other components in system 100 but not shown in FIG. 1.

In one embodiment, key recipient 126 may be provided with various keys usable to perform any key-related functions, such as unlocking various TAPs in system 100 to allow debug access to registers, buffers, and other internal locations, such as storage 144, where data values indicating machine state may be present within components in system 100. Various keys may be provided by manufacturers and/or designers of components in system 100 to one or more entities authorized to perform debug or other key-related functions on such components. These keys may also be programmed into system 100 during manufacture and/or configuration so that a key presented by an entity attempting debug or a key-related function, such as debug, may be compared by key recipient 126 to a key programmed into system 100. If the keys match, key recipient 126 may allow the key-related function, for example by unlocking a corresponding TAP.

For example, encoded key 115 may be an encoded version of a debug key to unlock TAP 142, and may be provided to key recipient 126 by fuse controller 116 through interface 130. To harden key transmission against power side channel attacks, keys may be encoded according to an embodiment of the present invention and programmed into system 100 in encoded form, then decoded upon receipt by key recipient 126 for comparison to a key presented by an entity attempting a key-related function. Therefore, the possibility of an attacker discovering keys through power side channel analysis and then using them to gain unauthorized access, such as to the contents of registers, buffers, and other internal locations in components of system 100 may be reduced. Many other uses of embodiments of the present invention are also possible.

Returning to coding unit 112, a data packet to be transmitted may be encoded such that the encoded packet has the same Hamming weight as the encoded packet for every other possible value of that data packet. For example, a four-bit binary data packet has $2^4$ or 16 possible values: one with a Hamming weight of zero (0000), four with a Hamming weight of one (0001, 0010, 0100, and 1000), six with a Hamming weight of two (0011, 0101, 0110, 1001, 1010, and 1100), four with a Hamming, weight of three (0111, 1101, 1011, and 1110), and one with a Hamming weight of four (1111). However, only the six four-bit data packets with a Hamming weight of two are possible encodings of two-bit data packets according to an embodiment of the present invention, so all of the four-bit data packets transmitted according to that embodiment have the same Hamming weight.

Furthermore, each of the possible values of the data packet is encoded such that the Hamming distance between any two of the encoded values is constant. Therefore, power consumption during transmission of encoded packets may be independent of the values of the un-encoded packets.

Data of any size may be encoded and transmitted according to embodiments of the present invention. In one embodiment, a datum of a first size ma be partitioned into a number of packets of a second, smaller size. For example, a 128-bit key may be partitioned into 64 packets, where the size of each un-encoded packet is two bits. Each two-bit packet may be encoded to generate a four-bit encoded packet. The receiver of the transmission may decode each of the 64 four-bit packets to generate 64 decoded two-bit packets, and assemble the 64 decoded two-bit packets into the 128-bit key.

Encoding may be performed according to any approach that satisfies two criteria. The first criterion is that every encoded packet has the same Hamming weight. The second criterion is that the Hamming distance between any two consecutively encoded packets is constant.

Figure 2:
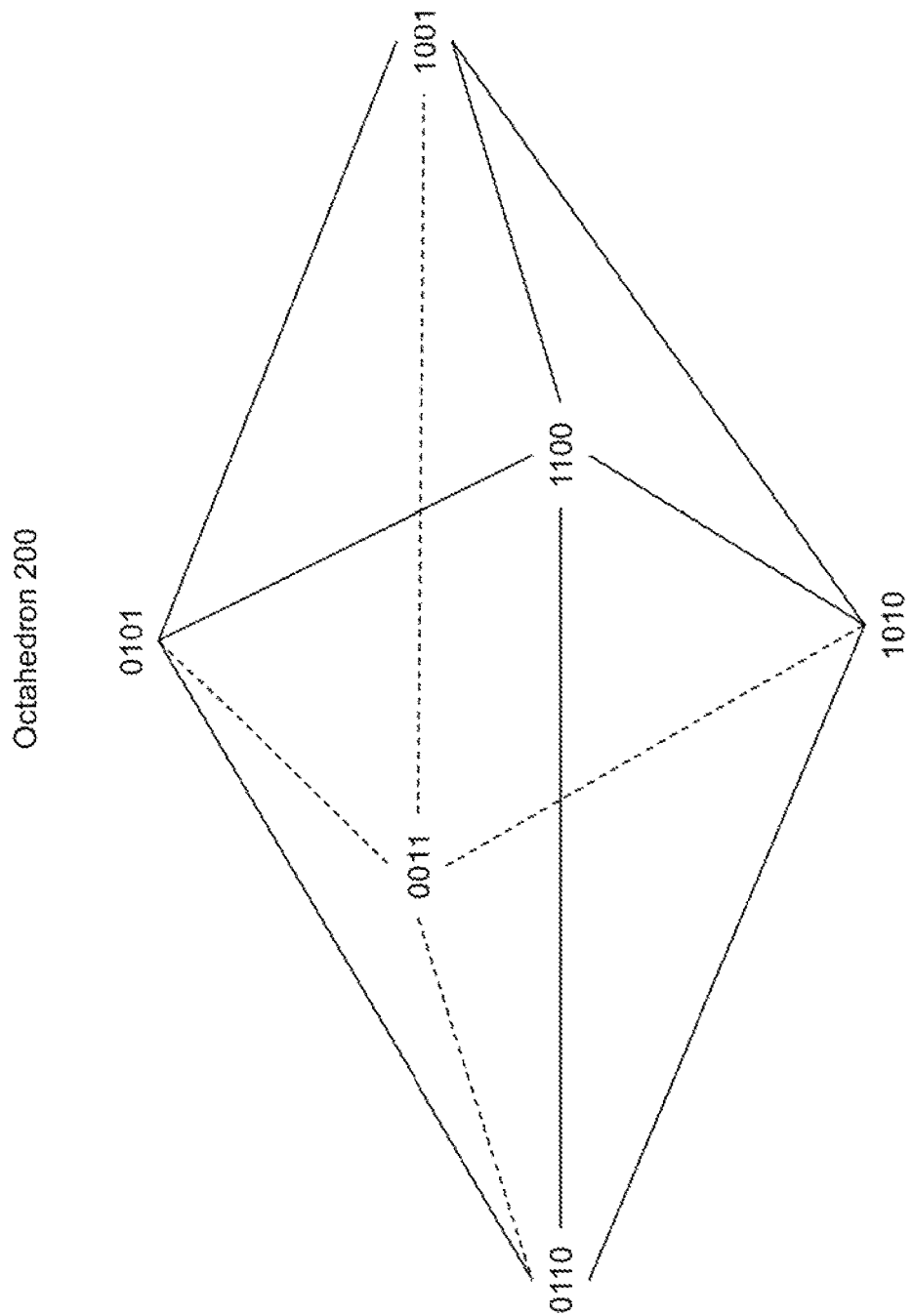
FIG. 2 illustrates a coding state machine according to an embodiment of the present invention.

In one embodiment, these two criteria may be satisfied by encoding two-bit packets into four-bit packets using an octahedron-based state machine or other hardware, firmware, or software logic. As illustrated by octahedron 200 in FIG. 2, each of the six vertices of the octahedron represents a four-bit value with a Hamming weight of two (0011, 0101, 0110, 1001, 1010, and 1100). The six vertices are arranged into an octahedron such that traveling, along an edge between any two vertices has the following property: one bit with a value of 1 keeps its value, one bit with a value of 0 keeps its value, one bit with a value of 1 changes to a value of 0, and one bit with a value of 0 changes to a value of 1.

For explanatory purposes, transitioning from one vertex of octahedron 200 to another may be described as moving in one of the four cardinal directions. For example, starting from vertex 1100, which may be referred to as the front, a transition to vertex 0101 may be described as traveling north, a transition to vertex 1001 may be described as traveling east, a transition to vertex 1010 may be described as traveling, south, and a transition to vertex 0110 may be described as traveling west. The path between any number of vertices may be envisioned by starting with the first vertex in front, then rotating the octahedron such that the next vertex is moved to the front, and so on. For example, the path from vertex 1100 to vertex 0101 to vertex 0011 may be described as traveling north from vertex 1100 to vertex 0101, (then rotating to move vertex 0101 to the front,) then traveling north again from vertex 0101 to vertex 0011.

Any of the vertices may be selected as the starting point for encoding, so long as the same vertex is used as the starting point for decoding. The starting point may be selected randomly. Each two-bit packet of the input datum is encoded based on its value and the current state of the state machine (e.g., the current vertex of the octahedron). The value of the two-bit packet is used to define the direction of travel (e.g., 00 means north, 01 means east, 10 means west, and 11 means south). The direction of travel leads to the next state, and the corresponding value of the next state is used as the encoded value of the two-bit packet that led to that state. The first encoded packet is used as one end (e.g., the high order end or the low order end) of an encoded datum. As each new two-bit packet is encoded, the resulting encoded four-bit packet is appended to the previously assembled portion of the encoded datum, until all of the two-bit packets have been encoded and the encoded datum is fully assembled. Assembly of the encoded datum may include storing each of the encoded packets in storage unit 114.

For example, to encode the eight-bit datum 01011011, the datum may be partitioned, starting with the high order bits, as 01, 01, 10, and 11, corresponding to a path of travel of east) east, west, and south. Using vertex 1100 as the starting point, traveling east leads to vertex 1001, so the first two-bit packet is encoded as 1001. From vertex 1001, traveling east leads to vertex 0011, so the second two-bit packet is encoded as 0011. From vertex 0011, traveling west leads to vertex 1001, so the third two-bit packet is encoded as 1001. From vertex 1001, traveling south leads to vertex 1010, so the fourth two-bit packet in encoded as 1010. Therefore, the eight-bit datum is encoded as the sixteen-bit datum 1001 0011 1001 1010.

Decoding may be performed by coding unit 122 and may be described as the inverse of encoding. Using the same starting vertex as used for encoded, each four-bit packet is used to specify the next vertex, and the value that corresponds to the direction that leads to that vertex is the decoded value of the four-bit packet. The first decoded packet is used as one end (e.g., the high order end or the low order end) of the decoded datum. As each new four-bit packet is decoded, the resulting decoded two-bit packet is appended to the previously assembled portion of the decoded datum, until all of the four-bit packets have been decoded and the decoded datum is fully assembled. Assembly of the decoded datum may include storing each of the decoded packets in storage unit 124.

For example, to decode the sixteen bit datum 1001 0011 1001 1010, start at the same vertex used for encoding. From vertex 1100, travel to vertex 1001 is east, so the first four-bit packet is decoded as 01. From vertex 1001, travel to vertex 0011 is east, so the second four-bit packet is decoded as 01. From vertex 0011, travel to vertex 1001 is west, so the third four-bit packet is decoded as 10. From vertex 1001, travel to vertex 1010 is south, so the fourth four-bit packet is decoded as 11. Therefore, the sixteen-bit datum is decoded as 01 01 10 11.

In various embodiments, decoding may include detecting conditions in which a specified vertex cannot be reached from the current vertex (e.g., requires more than one rotation) and/or the specified value is not assigned to a vertex (e.g., is not in the set of values having the same Hamming weight as the vertices). A fault, error, or other exception may be signaled upon the detection of any such condition.

Note that the above description involving an octahedron-based state machine represents one embodiment of the present invention. Other embodiments may use a modification of the described approach or another approach. Encoding of any datum length may be performed according to the embodiment of the present invention described above or according to an embodiment of the present invention using a different starting vertex, a different assignment of values to vertices, a different assignment of values to directions, a different input (un-encoded) packet length (i.e., other than two), a different output (encoded) packet length (i.e., other than four), a different order of input packets (e.g., starting with the low order packet instead of the high order packet), a different shape other than an octahedron), a different number of dimensions of the shape (i.e., other than three), and/or a different number and name of directions (i.e., other than the four cardinal directions), so long as the encoding satisfies the two criteria described above and the same shape and starting vertex are used for encoding and decoding.

In various embodiments, encoding may include using a first of a plurality of un-encoded packets to select a transition path from a plurality of transition paths away from a first state of a state machine, wherein die transition path leads to a second state and the first un-encoded packet is encoded with a value associated with the second state. In various embodiments, decoding may include using a first of a plurality of encoded packets to choose a state from a plurality of states of a state machine, and decoding the first encoded packet as a value associated with a transition path to the state. In various embodiments, encoding and decoding may be performed using a state machine based on a geometric shape.

Figure 3:
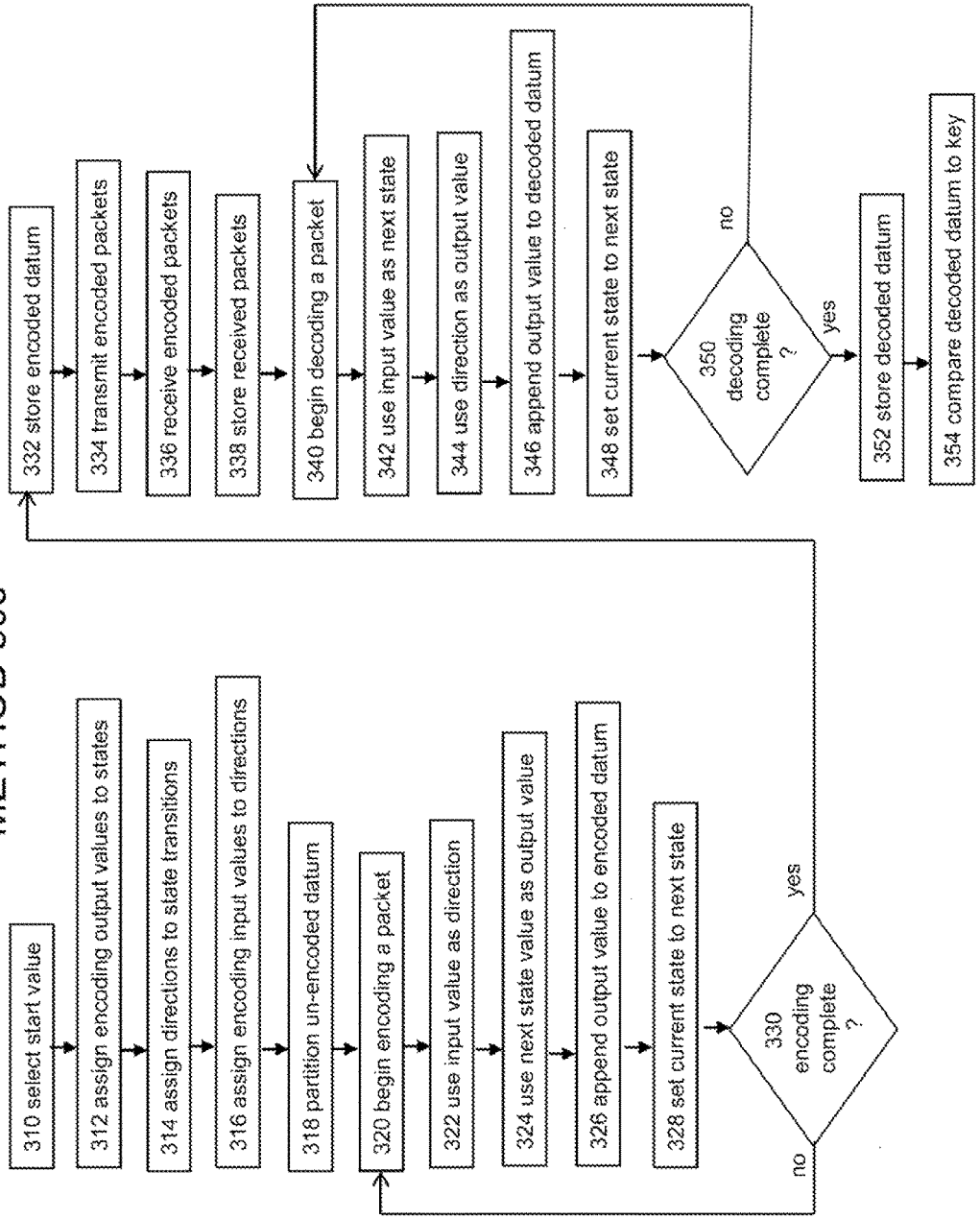
FIG. 3 illustrates a method for hardening data transmissions according to an embodiment of the present invention.

FIG. 3 shows method 300 for hardening data transmission against power side channel attacks. In box 310, a starting value is selected from a set of n-bit values having the same Hamming weight, where n may be any number and the n-bit values may be used as encoding output values. In box 312, each of the set of n-bit values is assigned to a state of state machine, such that the Hamming distance from the value of any state to the value of any other state reachable through a single transition is constant. In box 314, each direction in a set of directions is assigned to each possible single transition from the state corresponding to the starting value. In box 316, a different m-bit value is assigned to each direction, where m may be any number less than n and the m-bit values may be used as encoding input values.

In box 318, a p-bit datum, such as a key, where p may be any number equal to or greater than in, is partitioned into m-bit packets.

In box 320, encoding of one of the m-bit packets based on its value and the current state of the state machine begins, where for the encoding of the first m-bit packet of the p-bit datum, the current state of the state machine is the state corresponding to the starting value. In box 322, the value of the m-bit packet specifies the direction of the transition and therefore the next state. In box 324, the m-bit packet is encoded as the n-bit value corresponding to the next state. In box 326, all or part of an encoded datum is assembled by using the initially encoded n-bit value as an initial end of the encoded datum or by appending a subsequently encoded n-bit value to a previously assembled portion of the encoded datum. In box 328, the next state becomes the current state.

In box 330, it is determined whether encoding of the p-bit is complete. If not, method 300 returns to box 320 for encoding of the next m-bit packet. If so, method 300 continues to box 332.

In box 332, the encoded datum may be stored, for example in a fuse array in a first agent in an SOC. In box 334, the encoded datum is transmitted, for example, from the first agent to a second agent in the SOC, as a plurality of n-bit packets in the same order as they were generated. In box 336, the encoded datum is received, for example, by the second agent, as the plurality of n-bit packets. In box 338, the encoded datum may be stored, for example, in a storage location in the SOC that is accessible to the second agent.

In box 340, decoding of one of the n-bit packets based on its value and the current state of the state machine begins, where for the decoding of the first n-bit packet of the encoded datum, the current state of the state machine is the state corresponding to the starting value. In box 342, the value of the n-bit packet specifies the next state and therefore the direction of the transition. In box 344, the n-bit packet is decoded as the m-bit value corresponding to the direction of the transition. In box 346, all or part of a decoded datum is assembled by using the initially decoded m-bit value as an initial end of the decoded datum or by appending a subsequently decoded m-bit value to a previously assembled portion of the decoded datum. In box 348, the next state becomes the current state.

In box 350, it is determined whether decoding, of the encoded datum is complete. If not, method 300 returns to box 340 for decoding of the next n-bit packet. If so, method 300 continues to box 352.

In box 352, the decoded p-bit datum may be stored, for example, in a storage location in the SOC that is accessible to the second agent. In box 354, the decoded p-bit datum may be compared to a key, for example, a debug key presented by an entity attempting to debug a component in the SOC, a content protection key presented by an entity attempting to access content from or through the SOC, or any other type of key.

In various embodiments of the present invention, the method illustrated in FIG. 3 may be performed in a different order, with illustrated boxes combined or omitted, with additional boxes added, or with a combination of reordered, combined, omitted, or additional boxes.

As one example of a possible difference between method 300 and an alternative embodiment, the first agent may perform the encoding and the encoded datum may be transmitted without storing it in the first agent. As another example, transmissions of the packets of the encoded datum may be interleaved with the encoding, in other words, the transmission of one or more n-bit packets may occur before all of the m-bit packets have been encoded. As another example, decoding of the encoded datum may begin before all of the n-bit packets have been received. As another example, one or both of storing the encoded datum and storing of the decoded datum in a storage location accessible to the second agent may be omitted.

As another example, decoding of the encoded datum by the second agent may be omitted. In such an example, the second agent may receive the encoded datum and, without decoding the key, compare the encoded datum to an encoded key. In such an example, an entity attempting a key-related function may present an encoded key other than an un-encoded key. Such an approach may be desired to reduce the effectiveness of side channel attacks directed to the decoding operation. Many other method embodiments are possible within the scope of the present invention.

Embodiments or portions of embodiments of the present invention, as described above, may be stored on an form of a machine-readable medium. For example, all or part of method 300 may be embodied in software or firmware instructions that are stored on a medium readable by a processor, which when executed by the processor, cause the processor to execute an embodiment of the present invention. Also, aspects of the present invention may be embodied in data stored on a machine-readable medium, where the data represents a design or other information usable to fabricate all or part of a processor or other component.

Thus, embodiments of an invention for hardening data transmission against power side channel attacks have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system comprising:
a first processor to transmit an encoded datum through an interface in a plurality of encoded packets, the first processor including encoding circuitry to encode an un-encoded datum to generate the plurality of packets, the encoding circuitry including a state machine based on a geometric shape, wherein each vertex of the geometric shape corresponds to a state of the state machine and represents one of a plurality of values, each value having a same number of bits and a same Hamming weight, and wherein the geometric shape is a polyhedron; and
a second processor to receive each of the plurality of encoded packets from the interface;
wherein each of the encoded packets has the same Hamming weight, and wherein a Hamming distance between any two consecutively transmitted encoded packets is constant,
wherein the first processor and the second processor are included in a system-on-a-chip.

2. The system of claim 1, wherein the first processor includes a storage unit to store the encoded datum.

3. The system of claim 1, wherein the first processor includes a fuse array storing the encoded datum.

4. The system of claim 1, wherein the second processor includes a decoder to decode the plurality of encoded packets to generate a plurality of decoded packets.

5. The system of claim 4, wherein the second processor includes a key recipient to compare a key to a decoded datum generated from the plurality of decoded packets.

6. A method comprising:
encoding, by encoding circuitry, an un-encoded datum to generate a plurality of encoded packets, the encoding circuitry including a state machine based on a geometric shape, wherein each vertex of the geometric shape corresponds to a state of the state machine and represents one of a plurality of values, each value having a same number of bits and a same Hamming weight, and wherein the geometric shape is a polyhedron;
transmitting each of the plurality of encoded packets, wherein each encoded packet has a same Hamming weight and wherein a Hamming distance between any two consecutively transmitted encoded packets is constant; and
receiving, by decoding circuitry, each of the plurality of encoded packets,
wherein the encoding circuitry and the decoding circuitry are included in a system-on-a-chip.

7. The method of claim 6, further comprising partitioning the un-encoded datum into a plurality of un-encoded packets and encoding each of the un-encoded packets to generate the plurality of encoded packets.

8. The method of claim 6, further comprising decoding, by the decoding circuitry, each of the plurality of encoded packets to generate a plurality of decoded packets and assembling the plurality of decoded packets into a decoded datum.

9. The method of claim 6, further comprising retrieving the plurality of encoded packets from a fuse array.

10. The method of claim 6, wherein receiving each of the plurality of encoded packets is performed by a key-recipient, and wherein the method further comprises comparing, by the key-recipient, the plurality of encoded packets to a key.

11. The method of claim 8, further comprising comparing the decoded datum to a key.

12. The method of claim 7, wherein encoding a first of the plurality of un-encoded packets includes using the first un-encoded packet to select a transition path from a plurality of transition paths away from a first state of the state machine.

13. The method of claim 12, wherein the transition path leads to a second state and the first un-encoded packet is encoded with a value associated with the second state.

14. The method of claim 8, wherein decoding a first of the plurality of encoded packets includes using the first encoded packet to choose a state from a plurality of states of the state machine.

15. The method of claim 14, wherein the first encoded packet is decoded as a value associated with a transition path to the state.

16. An apparatus comprising:
encoding circuitry to encode an un-encoded datum to generate a plurality of encoded packets;
decoding circuitry to decode the plurality of encoded packets transmitted through an interface, the decoding circuitry including a state machine based on a geometric shape, wherein the geometric shape is a polyhedron and wherein each vertex of the geometric shape corresponds to a state of the state machine and represents one of a plurality of values, each value having a same number of bits and a same Hamming weight, wherein each of the encoded packets has the same Hamming weight, and wherein a Hamming distance between any two consecutively transmitted encoded packets is constant; and
a memory in which to store a plurality of decoded packets generated from the plurality of encoded packets, wherein each of the plurality of decoded packets is arranged in order of transmission of each of the corresponding encoded packets to assemble a decoded datum,
wherein the encoding circuitry, the decoding circuitry, and the memory are included in a system-on-a-chip.

* * * * *